United States Patent [19]

Lewis

[11] 4,041,489
[45] Aug. 9, 1977

[54] SEA CLUTTER REDUCTION TECHNIQUE

[75] Inventor: Bernard L. Lewis, Oxon Hill, Md.

[73] Assignee: The United States of America as represented by the Secretary of the Navy, Washington, D.C.

[21] Appl. No.: 482,970

[22] Filed: June 25, 1974

[51] Int. Cl.² .............................................. G01S 7/28
[52] U.S. Cl. ............................................. 343/17.1 R
[58] Field of Search .................................. 343/17.1 R

[56] References Cited

U.S. PATENT DOCUMENTS

| | | | |
|---|---|---|---|
| 3,175,214 | 3/1965 | Ramsay et al. | 343/17.1 R X |
| 3,208,065 | 9/1965 | Gutleber et al. | 343/17.1 R |
| 3,212,087 | 10/1965 | Blass et al. | 343/17.1 R X |
| 3,374,478 | 3/1968 | Blau | 343/17.1 R X |
| 3,510,595 | 5/1970 | Gutleber | 343/17.1 R X |
| 3,631,490 | 12/1971 | Palmieri | 343/17.1 R X |

Primary Examiner—Malcolm F. Hubler
Attorney, Agent, or Firm—R. S. Sciascia; Philip Schneider; Norman V. Brown

[57] ABSTRACT

A multi carrier-frequency pulsed radar system in which each carrier-frequency reflected radar signal is separately processed by parallel receiver branches. The output of each receiver branch is multiplied together to form the product of the separate receiver outputs, which product is then displayed on a plan-position-indicator (P.P.I.) display.

3 Claims, 9 Drawing Figures

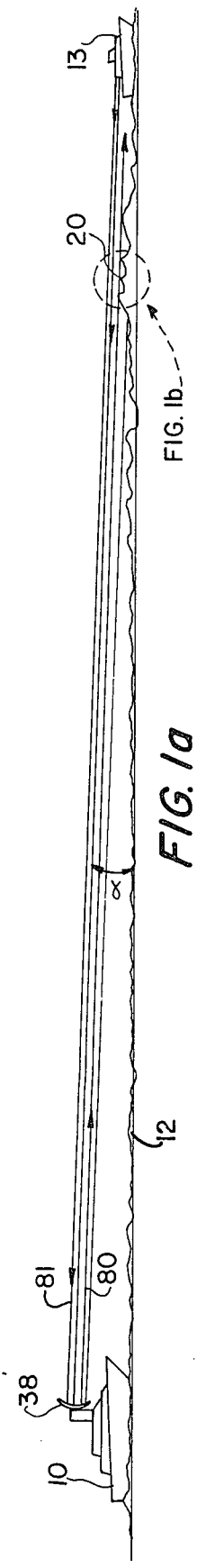
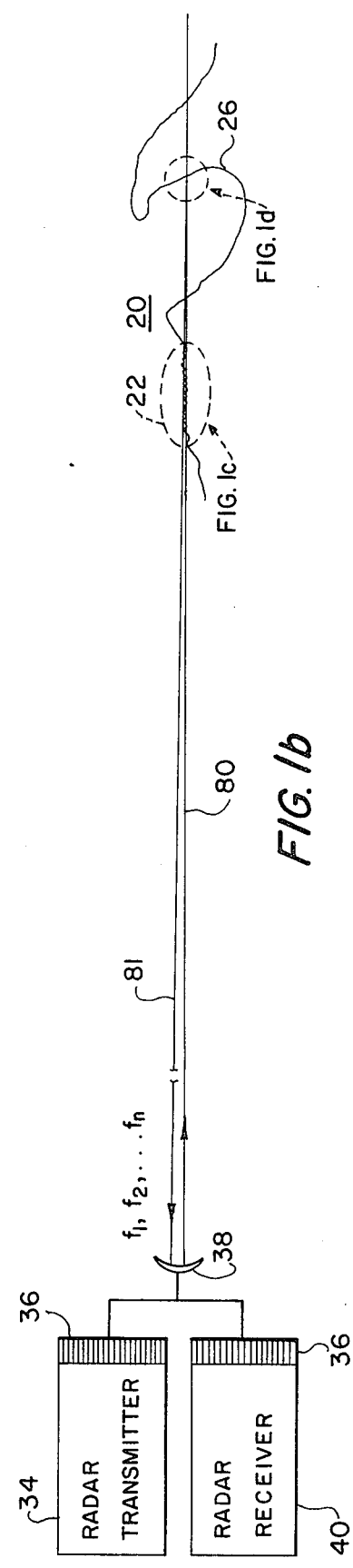
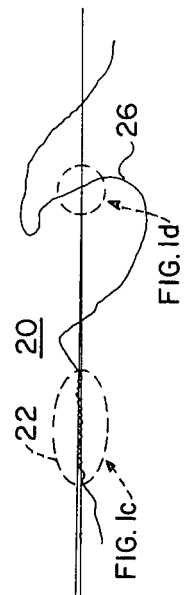
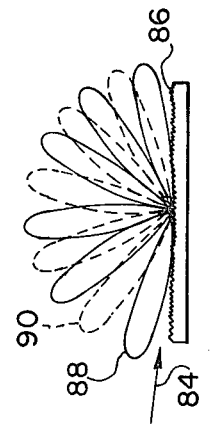
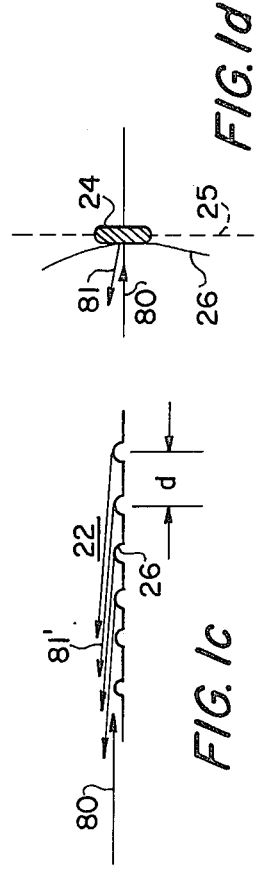

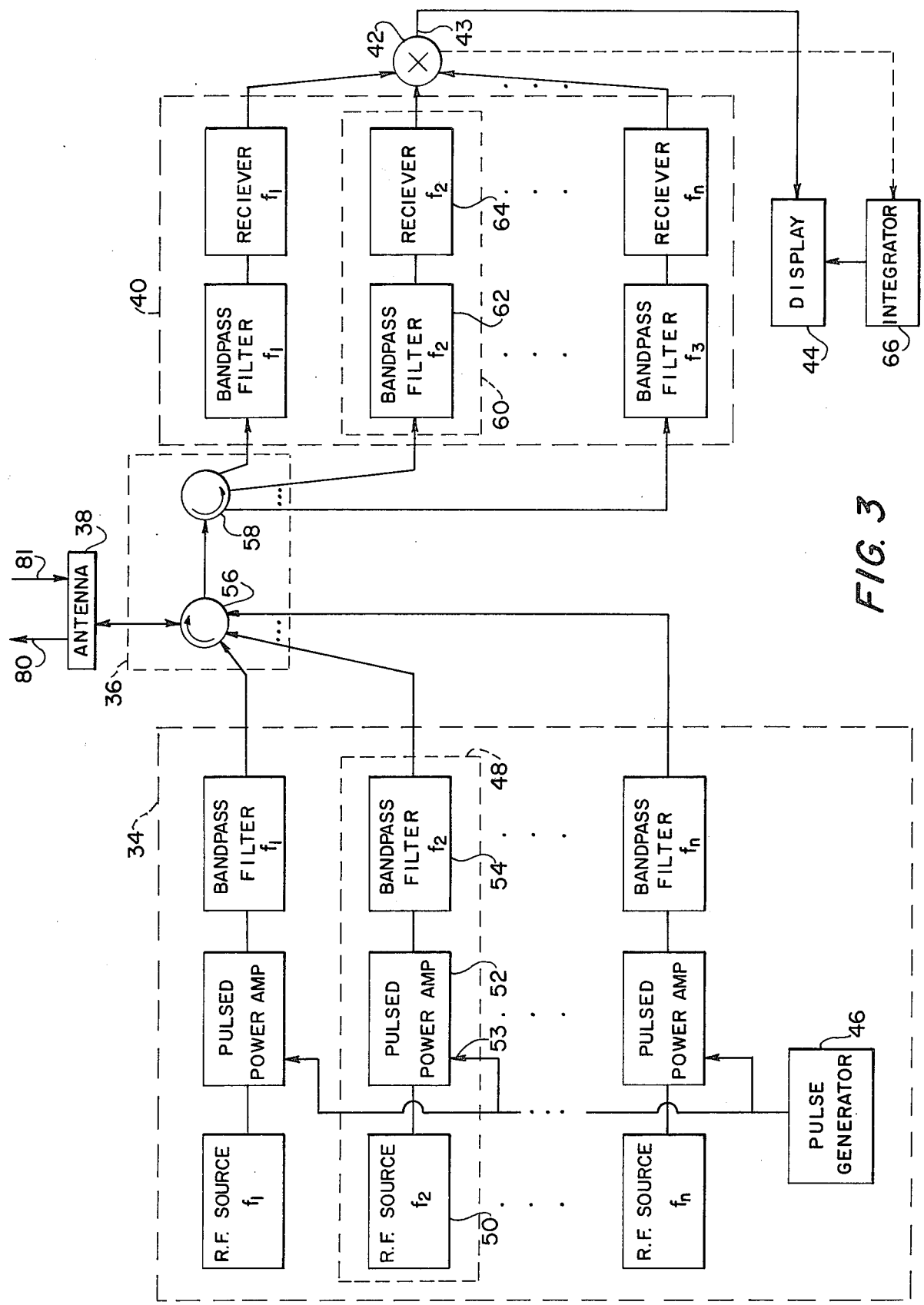

SEA CLUTTER REDUCTION TECHNIQUE

BACKGROUND OF THE INVENTION

The present invention relates to radar systems, and more particularly to radar systems which reduce the effect of sea-clutter.

A radar target is detected by receiving radar energy of the transmitted radar beam which has been reflected back to the receiver by the target. When attempting to detect targets on the surface of the ocean, the waves also reflect the transmitted beam back to the receiver with varying amounts of success, causing what is commonly called sea-clutter. When waves cause particularly large reflection, it is termed a sea-spike. A sea-spike can appear as a target, and will occur randomly in time and location, lasting for approximately one-hundredth of a second.

The collective effect of radar reflection from the oceans's surface including that of sea-spikes is termed sea-clutter because it may cause a radar display to appear cluttered with false targets and distracting non-target radar returns. It is well known that sea-clutter has been a long felt problem causing interference with target detection and therefore resulting in degraded system performance.

Prior methods attempting to reduce the effect of sea-clutter have included techniques which either necessitate increased range and angular resolution of the radar, or which require utilization of scan-to-scan integration and rapidly rotating radar antennas. Increasing resolution of the radar by shortening the pulse-length, although fairly satisfactory in reducing the average value of the sea-clutter, does not significantly affect the magnitude of the sea-spikes, and they remain essentially unchanged.

Utilization of scan-to-scan integration in conjunction with a rapidly rotating radar antenna can reduce the magnitude of received sea-spikes somewhat but is not a satisfactory solution for two reasons: first, lengthy integration time is required to significantly reduce the magnitude of received sea-spikes, and secondly, the radar platform must be either motionless (very difficult for a ship in water) or be compensated for its motion. Compensation for motion is both difficult and expensive while lengthy integration times are generally quite unsatisfactory.

The present invention overcomes these difficulties. The radar antenna can be located on a moving platform without any compensation for motion being necessary. In addition, long objectionable integration time is also unnecessary.

OBJECTS OF THE INVENTION

It is an object of the present invention to significantly reduce the objectional effect of sea-spike radar reflections without resort to techniques of increased range or angular resolution.

It is a further object of the present invention to reduce the effect of sea-clutter without resort to compensation for antenna-platform motion and without resort to long signal integration time.

Other objects, advantages and novel features of the invention will become apparent from the following detailed description on the invention when considered in conjunction with the accompanying drawings werein:

DESCRIPTION OF THE DRAWINGS

FIGS. 1a–1d is a pictorial illustration of the situation and process by which a radar beam from a ship is reflected by the ocean's surface.

FIG. 2 is an illustration of reflection of incident energy from a defraction grating.

FIG. 3 is a schematic diagram of an embodiment of the present invention.

SUMMARY OF THE INVENTION

Figure 4A:
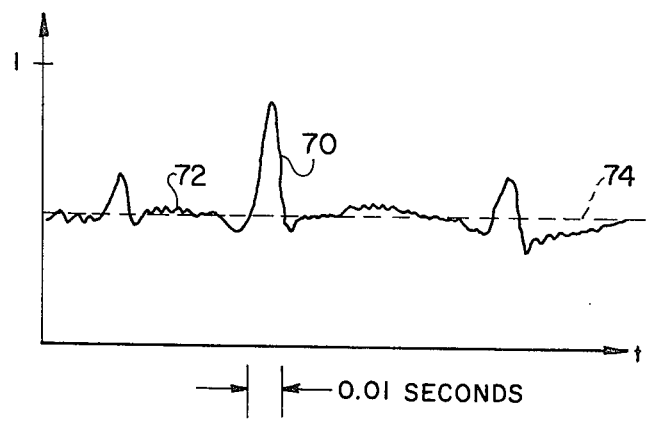
FIGS. 4a–4c depicts variation of magnitude in time of a typical reflected return radar signal under various signal transmitting and processing arrangements.

The invention comprises a radar system in which a radar transmitter radiates simultaneously short pulses of different carrier-frequency energy. Waves of the type causing sea-spike reflection through a Bragg-scatter mechanism at one of the transmitted frequencies generally will not produce reflections to the antenna at a different frequency. Received reflected energy of each different frequency carrier are separately processed. The separate receiver-processor outputs are then multiplied together, and the multiplicative product is displayed in a conventional manner. By this technique, the large signal Bragg-reflection at one frequency is effectively canceled by the small return signal at another frequency.

DETAILED DESCRIPTION OF THE INVENTION

A generally encountered sea-clutter return radar signal situation is depicted in FIG. 1a. A ship 10 is depicted as traveling on the oceans's surface 12 carrying a radar antenna 38. Antenna 38 is aimed along the ocean surface 12 while searching with a radar beam 80 for targets 13 such as another ship. Reflections from a target 13 as well as from the surface of the ocean waves 20 reflect a portion of the incident radar beam 80 in a reflected return radar beam 81. The incident beam generally is at a small angle $\alpha$, typically 1° or 2° from the surface 12 of the ocean.

Many simple and complex surfaces occur randomly on the ocean surface shaped by the forces of wind and tide. Two of the surfaces which occur on ocean waves are of very special interest with regard to sea-spikes and sea-clutter: these are, first, a flat portion or facet 24 along the generally concave surface 26 of a breaking wave, and secondly, a rippled portion 22 along a more or less horizontal section of wave surface. Generally, it is these two types of surface which reflect incident radar energy back to the receiver to appear as sea-clutter. Reflection of incident radar energy may occur primarily through two important mechanisms, termed Specular and Bragg reflection, respectively.

An observer experiences Specular reflection when viewing an ocean or lake while the sun is shining brightly. Little portions of the water's surface commonly called facets act as mirrors, reflecting the sun's rays to the observer. The rays strike a flat facet at an angle and are reflected at the same angle. In other words, the angle of incidence of the sun's rays on the facet is equal to the angle of reflection of the reflected ray from the facet. The radar receiver experiences a similar effect as the observer. A facet 24, large with respect to the radar wavelength, properly located on the surface of the wave can act to reflect the incident radar beam 80 (FIGS. 1b and 1d). The plane 25 of the facet surface must be nearly normal to the radar beam in order to reflect incident energy back to the receiver since the angle of the reflected radar beam must be equal to that of the incident beam. The probability that at any given time any of the facets 24 will line up normally to the incident radar beam is very small. Therefore the probability of a sea-spike occurring from Specular reflection is also quite low (Skolik, Radar Handbook, Chapters 26 and 31). This means that sea-spikes caused by Specular reflection are indeed rare, and therefore they do not often appear as targets to the radar system. More important then specular reflection is the effect of Bragg-scatter, which is similar in mechanisms to reflection of energy incident on a diffraction grating. A rippled or diffraction grating-like surface 22 on a portion of ocean wave 20 is sometimes formed by the wind. This surface is illustrated more clearly in detail in FIG. 1c. The ripples are spaced equally apart by a distance d, which is on the order of a wavelength of the radar radiation. An incident radar beam 80 impinges upon the rippled surface 22 and a reflected beam 81' occurs. The reflection mechanism is the same as that of a diffraction grating, well known as Bragg-scattering. Bragg-scattering may also be caused by the scattering of energy incident on multiple small facets having appropriate spacing within a range cell.

Thus, for any given rippled surface and particular frequency, a specific beam pattern will result due to effects of constructive and destructive interference, as illustrated in FIG. 2. An incident beam 84 of energy of a frequency $f_1$ strikes the diffraction grating 86 and reflects the energy in a pattern indicated by the solid lobes. Lobe 88 is typical and may be directed essentially back along the incident beam path 84.

Each particular reflection or scattering pattern is related to both the spacing of the ripples 26 and the radar wavelength. Thus, when the wavelength of energy of incident beam 84 is changed somewhat, the reflection pattern changes as well, as indicated by the shifted direction of dotted lobes 90. For example, a change of 1% in wavelength can cause the reflection pattern to drift causing lobe 88 to move to position 90, a change of several degrees. This small angular change is more than necessary to cause the reflected beam to completely miss the radar antenna 38. This phenomena of differing reflection patterns for impinging energy of different wavelengths is at the heart of the present invention.

The impinging radar beam 80 (FIG. 1) of the present invention is a multi-frequency carrier having corresponding multiple-wavelengths. If a rippled Bragg-scatter reflective wave surface 22 reflects energy of one carrier-frequency $f_1$ (corresponding to wavelength $\lambda_1$) to the receiver, then another carrier-frequency $f_2$ (corresponding to wavelength $\lambda_2$) will generally not be reflected back. In other words, the rippled diffraction-grating-like wave surface 22 will cause a large, sea-spike return to be received at the receiver for carrier-frequency $f_1$ and will cause negligible reflected energy to be received at the corresponding receiver for frequency $f_2$. On the other hand, a target will reflect both carrier-frequencies $f_1$ and $f_2$ essentially by the same amount through a specular-type reflection mechanism. Therefore a target reflecting incident energy of frequencies $f_1$ and $f_2$ will cause essentially equal strength signals to be received at both frequencies $f_1$ and $f_2$.

It follows from the above that, for a given Bragg-scatter reflective portion 22 of a wave, if a carrier frequency $f_1$ is reflected back to the receiver by the wave surface 22 thus giving a strong return signal, then a different carrier-frequency $f_2$ (for example $f_2 = 1.5f_1$) will not be reflected back to the antenna and will thus result in a weak return.

Referring to FIGS. 1b and 4, the preferring embodiment comprises a radar transmitter 34 which is connected through a coupler device 36 to a radar antenna 38. Multi-frequency radar energy is radiated from antenna 38 in the form of a radar beam 80. It is reflected in the form of beam 81 back to antenna 38 from a reflective surface. Antenna 38 is connected through coupler device 36 to a radar receiver 40. The output of receiver 40 is connected to a multiplier device 42.

Radar-transmitter 34 depicted in FIG. 3, comprises a pulse generator 46 and a series of essentially identical parallel transmitter-branches 48 each tuned to a different carrier-frequency. Each parallel-branch 48 consists of a radio-frequency generator 50 connected to a pulse power-amplifier 52, which is in turn connected to a transmitter band-pass filter 54. The output from each band-pass filter 54 is connected to antenna coupler 36. The output of pulse generator 46 is connected to each control input 53 of corresponding power-amplifiers 52.

Antenna coupler 36 is made up of two devices: a transmitter-circulator 56 and a receiver-circulator 58. Transmitter circulator 56 is connected to the output of each transmitter bandpass-filter 54, and is also connected to both antenna 38 and receiver-circulator 58.

Radar-receiver 40 consists of a series of essentially identical parallel receiver-branches 60, one for each corresponding transmitter carrier-frequency. Each receiver-branch 60 has bandpass-filter 62 connected between receiver-circulator 58 and the input of a receiver 64. The output of each receiver 64 is connected to an input of multiplier 42, which in turn has its output connected to a display 44. Alternatively an integrator device 66 can be connected between the output of multiplier 42 and display 44.

In operation, each radar-frequency generator 50 is adjusted to produce a radar carrier-frequency different from that of the other transmitter-branches 48. The output of radar-frequency source 50 is connected to the input of its respective pulse power amplifier 52. The output of pulse generator 46 is connected to the control input 53 of each pulse power amplifier 52.

The output of each radar-frequency generator 50 is amplified by power amplifier 52, but only while it is receiving a pulse signal from pulse-generator 46. Output radar-frequency energy then passes from the output of each pulsed power amplifier 52 through its corresponding transmitter bandpass-filter 54 to an input of the transmitter-circulator 56.

Transmitter bandpass-filters 54 are adjusted to allow only radar-frequency energy centered about the frequency of its corresponding radar-frequency generator 50 to pass relatively unattenuated, while other frequencies are reflected back to the transmitter and thus prevented from entering transmitter-circulator 56. This reflective filter is employed to allow signals of selected frequencies applied to the input of a circulator to reach the output port essentially unattenuated. For example, a circulator with ports A, B, C, and D has the property that the input to port A exits at port B while the input to port B exits at port C, etc. In this invention the filter connected to port B is tuned to reflect all energy reaching it except that of frequency $f_b$. Therefore all energy from other ports (e.g., $f_A$ from port A) is reflected back into the circulator. In this manner, all energy from transmitter-branches 48 is directed to antenna 38. Reflected energy returned to antenna 38 is similarly directed to the various receiver-circulator frequency selective ports.

Although the optimum frequency differences between carrier frequencies utilized in the present invention will be dependent upon sea-state and other environmental conditions present, a good estimation of the frequency separation required between carrier frequencies can be arrived at in the following fashion: the second frequency should be a multiple of the first frequency by approximately $(1.5)^1 B$, where B is twice the reciprocal of the radar pulse length; the third frequency should be a multiple of $(1.5)^2 B$ times the first and so on. Thus the $n^{th}$ frequency should be a multiple of the first by approximately $(1.5)^n B$. These frequencies can be adjusted somewhat to yield optimum results under particular environmental conditions.

Transmitter-circulator 56 directs the radar frequency energy from the output of bandpass-filters 54 to radar antenna 38, which then radiates this energy as a radar-beam 80. A portion of this beam will generally be reflected from the oceans's surface or a target and returned in a return radar-beam 81 to antenna 38.

Returned radar-energy is directed from antenna 38 to receiver-circulator 58 through transmitter-circulator 56. Receiver-circulator 58 then delivers nearly all of each of the received frequencies to the input of corresponding receiver bandpass-filters 62. Receiver bandpass-filter 62 are adjusted to allow only radar frequency energy within selected narrow frequency bands to pass (all other frequencies are reflected back into receiver-circulator 58). The passed frequency components arrive at the proper corresponding receiver bandpass-filter 62. This selected band of received energy is then detected, amplified and processed by the corresponding receiver 64. The output of receiver 64 is a unipolar pulse whose amplitude is proportional to the strength of the received radar-signal energy.

Each of these receiver 64 outputs are multiplied together in multiplier device 42 which forms the multiplicative product of the unipolar pulses presented at its inputs. The product of the multiplication is available at the output 43 of multiplier 42.

If a sea spike radar return is produced by ocean-wave Bragg-scatter, the strength of a particular return will be a function of the carrier frequency. Therefore, the product of the multiplication together of the output from all receivers 64 (each receiver responding to a different carrier frequency) will be essentially proportional to the echo amplitude of the smallest return of the set of different carrier-frequency returns received. Thus, the output of the multiplier device 42 will be small if one of the carrier-frequencies is weakly received. This will occur if one of the carrier-frequencies corresponds to a frequency sufficiently different from a strongly received frequency signal (caused by Bragg-scatter) so as to be weakly received because of the shifted reflection-scattering pattern.

It is important to note that the numerically low-valued product referred to above differs from the type of output which would be obtained by conventional signal-averaging integration technique, in which the low-valued signal would tend to disappear when averaged with the larger returns. It is the multiplication process itself which must be employed to obtain the low output (with other than an infinite number of samples).

The multiplication process can be followed by an optional integration process, if desired, so that a cross-correlation function may be implemented in the radar system. If this integration is desired, the output signal from output 43 of multiplier 42 is sent to integrator 66 which integrates it over a period of time and constantly supplies the result to the display 44. Also, the display screen itself can be used to perform the integration by utilizing persistance of the display screen phosphor. The cross-correlation process could also be employed with any other function which is sensitive to sea-spikes.

The improvement in radar system performance by utilizing the present invention is manifest. An indication of the kind of improvement may be gained from the following discussion: FIG. 4 depicts the variation in time of the strength of a typical radar signal reflected by the oceans's surface when no target is present. Strength of the reflected return signal is indicated by the height along the vertical axis, while time is shown increasing along the horizontal axis. The average value of the sea-clutter is indicated by dashed line 74. FIG. 4a depicts the sea-clutter situation when no attempt is made to minimize it other than the usual signal averaging over time in conjunction with a relatively long radar pulse (i.e., on the order of microseconds). The peaks 70 are due to radar reflections caused by specular of Bragg reflection (sea-spikes) while the line 72 between peaks 70 represents the average value of the relatively small effect of scattered reflected radar energy, or background noise.

Figure 4B:
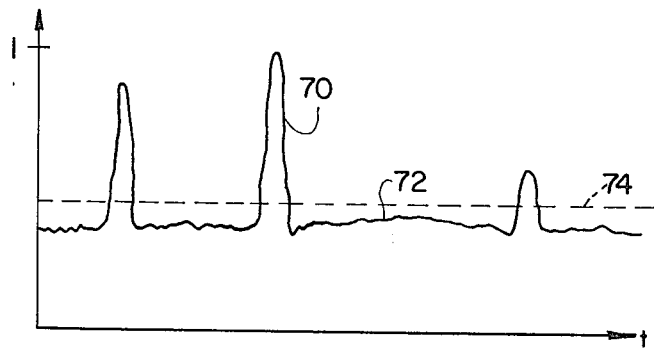

The effect of increasing resolution of the radar is indicated in FIG. 4b. Background noise level 72 is lowered, but sea-spikes 70 remain essentially unchanged.

Figure 4C:
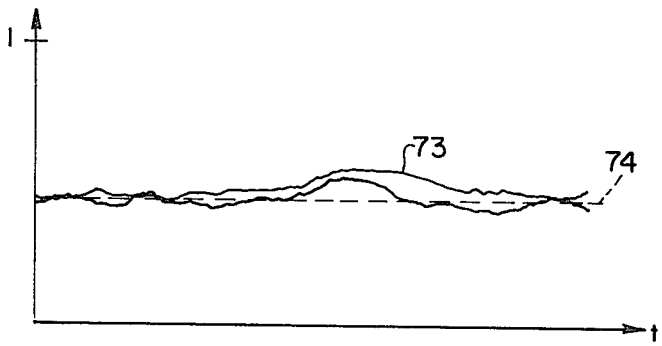

A dramatic effect is clearly evident when the present invention is employed. By utilization of the present invention, a drastic reduction of sea-spikes 70 as indicated in FIG. 4c is clearly seen. If a multi-carrier frequency were used with an averaging technique, the result would be useful although not as great as when used in combination with the previously described multiplication technique. This difference may be understood by a simple example comparing the two; results are presented in Table 1 for the averaging technique and in Table 2 for the present invention.

TABLE 1

| | AVERAGING TECHNIQUE | | | |
|---|---|---|---|---|
| | Strength of return signal at $f_1$ (voltage) | Strength of return signal at $f_2$ (voltage) | Operation | Result |
| TARGET | 1 | 1 | $\frac{1+1}{2}$ | 1 |
| Bragg-scatter Sea-spike | 1 | 0.1 | $\frac{1+0.1}{2}$ | .55 |

TABLE 2

| | MULTIPLICATIVE TECHNIQUE | | | |
|---|---|---|---|---|
| | Strength of return signal at $f_1$ (voltage) | Strength of return signal at $f_2$ (voltage) | Operation | Result |
| TARGET | 1 | 1 | $1 \times 1$ | 1 |
| Bragg-scatter Sea-spike | 1 | 0.1 | $1 \times 0.1$ | 0.1 |

The averaging technique in combination with a two frequency carrier thus would yield a ratio of target-to-sea-spike of 1:0.55, or approximately 1.8. In other words the sea-spike would be approximately 6dB lower than the target in signal strength. In contrast, the combined technique of multifrequency and multiplication in accordance with the present invention yields a ratio of 1:0.1 or 10. This is equivalent to the sea-spike being 20dB down below the maximum strength.

Thus it is clear that the present invention can significantly reduce the effect of sea-clutter by utilizing a multi-carrier-frequency radar system in which the resultant output signal resulting from separately processing each different carrier-frequency reflected-return is multiplied together to form their product. The technique of the present invention will greatly reduce the number of false alarms and prevent target detection only in rare instances and for the very brief period (on the order of microseconds) in which a target and sea-spike occupy the same resolution cell and destructively interfere on one or more carrier frequencies. This later instance has a low probability of occurance and thus would not significantly alter the cumulative probability of detection on real targets.

Upon utilization of a multi-frequency signal and multiplication in accordance with the present invention, a target (reflecting essentially all frequencies equally) appears relatively large while on the other hand a Bragg-scatter-reflection sea-spike appears relatively smaller than in prior sea-clutter reduction techniques. In this way the prodominant cause of large sea-spike (Bragg-scatter-reflection) is itself used as the basis of substantially reducing, if not completely eliminating its effect on the radar system.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. A radar system comprising:
   a radar transmitter for generating a multi-frequency radar pulse, said pulse having at least two discrete carrier frequency components;
   radar antenna means for radiating said radar pulse and for receiving the return radar signal;
   first coupling means for coupling said transmitter means to said antenna means whereby the energy of said pulse is directed only to said antenna means;
   a radar receiver for receiving and separately simultaneously processing each of said carrier frequency components of said return signal;
   second coupling means for coupling said antenna means to said receiver means whereby the energy of said return radar signal is directed only to said receiving means;
   multiplying means connected to the output of said receiver for multiplying together the processed output of each frequency component; and
   means connected to the output of said multiplying means for indicating the result of said multiplication whereby said receiving signals having only radar frequency energy within selected narrow frequency bands are detected in said radar receiver and constitute said processed output, and said processed outputs of each said frequency component are multiplied together in said multiplying means,
   said radar transmitter comprising parallel transmitter branches, each of said branches being capable of generating an output radar signal pulse of predetermined radar frequency energy, each said frequency dfferent from the frequency of the other of said branches, said branches being simultaneously operable to produce a multi-frequency radar pulse having at least two carrier frequency components,
   said radar receiver connected to said second coupling means having parallel receiving branches, equal in number to the number of said parallel transmitter branches, and having corresponding receiving frequencies,
   said second coupling means coupling the received signals to each input of said receiving branches whereby the energy of said return radar signal is directed to said parallel receiver branches having corresponding receiving frequencies,
   said multiplying means being connected to the output of each said parallel receiver branch for combining the output of each of said receiving branches by multiplying them all together to form the product thereof,
   each said parallel transmitter branch comprising a radar frequency generator, a pulsed power amplifier connected to said radar frequency generator for amplifying the output of said radar frequency generator, each said pulsed power amplifier being connected to a pulse generator whereby each pulsed power amplifier amplifies only during a period that it receives a pulse from said pulse generator, and bandpass filter connected to the output of said pulsed power amplifier, and
   each said parallel receiver branch comprising a bandpass filter and a radar frequency receiver connected in series in the order recited and further wherein said receiver means includes a signal detection means.

2. The radar system in accordance with claim 1 wherein said multiplier means includes an integrator means for integrating the said product over a period of time.

3. The radar system in accordance with claim 1 wherein said indicating means is a cathode ray display tube.

* * * * *